(12) United States Patent
Scott et al.

(10) Patent No.: US 8,010,624 B2
(45) Date of Patent: Aug. 30, 2011

(54) DYNAMIC COMPOSITION FOR IMAGE TRANSMISSION

(75) Inventors: Sean M. Scott, Sammamish, WA (US); Derek Gaw, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 341 days.

(21) Appl. No.: 12/057,013

(22) Filed: Mar. 27, 2008

(65) Prior Publication Data

US 2009/0248831 A1    Oct. 1, 2009

(51) Int. Cl.
    *G06F 15/16*    (2006.01)
(52) U.S. Cl. ......... 709/217; 709/216; 709/218; 709/219
(58) Field of Classification Search ................. 709/217, 709/219, 218, 216
    See application file for complete search history.

(56) References Cited

U.S. PATENT DOCUMENTS

| | | | | |
|---|---|---|---|---|
| 2006/0238547 | A1* | 10/2006 | Spencer et al. | 345/619 |
| 2007/0094588 | A1* | 4/2007 | Klassen et al. | 715/501.1 |
| 2008/0059889 | A1 | 3/2008 | Parker et al. | |
| 2008/0071559 | A1 | 3/2008 | Arrasvuori | |
| 2009/0228784 | A1* | 9/2009 | Drieu et al. | 715/235 |

OTHER PUBLICATIONS

International Search Report mailed on Apr. 14, 2009, for International Application No. PCT/US09/35090, filed on Feb. 25, 2009, 2 pages.

* cited by examiner

*Primary Examiner* — Jeffrey Pwu
*Assistant Examiner* — Abdelnabi O Musa
(74) *Attorney, Agent, or Firm* — Kilpatrick Townsend & Stockton LLP

(57) ABSTRACT

The number of connections and/or requests needed to obtain or provide image content in an electronic environment can be reduced by dynamically composing the content when needed to serve a request. In a case where a large number of images are to be transmitted across a network, the images can be determined at the time of the request for transmission and can be composed into a single, master image. Positional information for the images can be stored and sent with the master image to a device requesting the transmission. Using the positional information with dimensional information for the images, the device is able to use an application such as cascading style sheets (CSS) sprites to extract each of the plurality of images, thus obtaining all the images using a single request and single connection. Multiple master images can be used if appropriate.

23 Claims, 4 Drawing Sheets

DYNAMIC COMPOSITION FOR IMAGE TRANSMISSION

BACKGROUND

As an increasing amount of information is available electronically, such as over the Internet, the volume and variety of content that can be displayed at any one time for a number of users increases as well. In an example where a user searches for content based on keywords or queries, for example, a large number of items can be returned in a result page. In cases where each result might have a corresponding image, such as in an image search through a search engine, the amount of data that needs to be transferred to the device displaying the page can cause a substantial delay in the overall load time. In order to reduce the load on servers providing such content, many browsers or other client-side graphical user interface (GUI) applications limit the number of connections to a given server or host name at any given time. For example, many such interfaces currently limit a user to two concurrent connections to a host. The limit on the number of connections means that, for a page with 100 images, an average of 50 requests will be needed on each connection to retrieve the images from a common host. In one example electronic environment, as little as 5% of the time is spent downloading an HTML document, with as much as 95% being spent making HTTP requests to fetch components (i.e., images and scripts) in that HTML document. Accordingly, it is desired to reduce the amount of time needed to request and download the components for a page.

One conventional approach is to utilize several servers (real or virtual) or different host names (e.g., images1.hostname.com, images2.hostname.com). In this way, the number of concurrent connections from a single browser can be increased. For example, if there are 50 servers and a browser can have 2 connections to each server, then all 100 images on the example page can be downloaded in parallel. Otherwise, with 2 connections there would potentially be 50 images for each connection on average to be downloaded in sequence (depending on speed and image size the actual number would likely not be split evenly over time between the 2 connections). As should be apparent, however, it is sometimes not practical to have a sufficient number of servers to handle the number of images that can be presented on a given page, as well as try to generate and maintain the links, URLs (uniform resource locators), or other mappings to the images on the various servers or hostnames. This can be particularly problematic where the content changes often. The performance further is not optimal, as there are still 100 separate requests, even if done in parallel, which significantly increases load on the servers and increases network and system traffic. Further still, each image is stored and/or transferred separately, which prevents further compressing the images based on shared characteristics of the images.

Accordingly, among other improvements, it is desirable to improve processes for requesting and/or delivering content in an electronic environment, particularly where the content is determined dynamically and/or comes from multiple sources.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to transferring content in an electronic environment. In various approaches, multiple instances of content can be composed to reduce the number of connections needed to obtain the content. Multiple instances of content also can be composed to reduce the amount of time and resources needed to otherwise separately request each individual instance.

Figure 1:
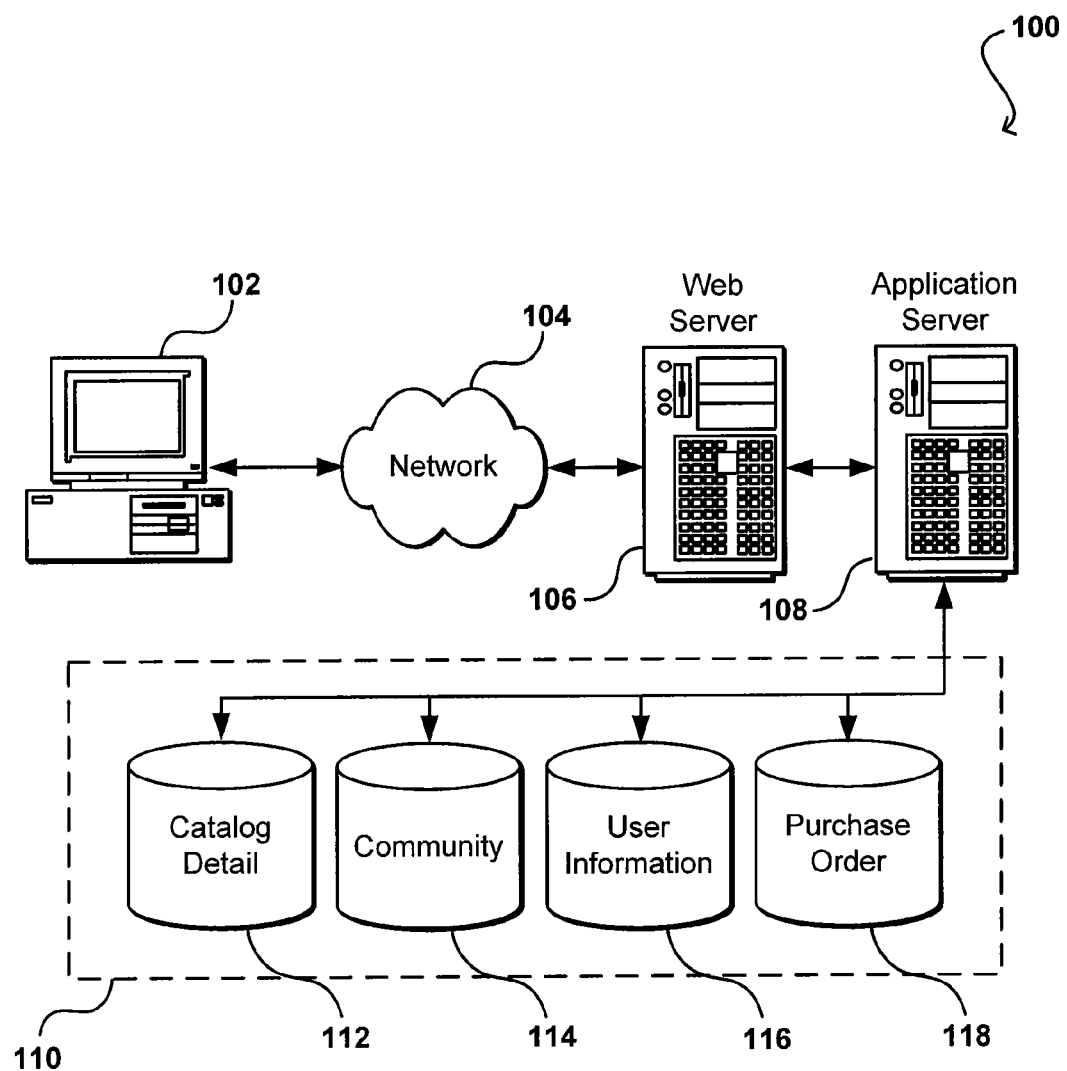
FIG. 1 illustrates a system configuration that can be used in accordance with one embodiment.

FIG. 1 illustrates an example of an environment 100 for implementing aspects in accordance with various embodiments. As will be appreciated, different environments may be used, as appropriate, to implement various embodiments. The environment 100 shown includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The environment in one embodiment is a distributed computing environment utilizing several computer systems and components that are interconnected via communication links, using one or more computer networks or direct connections. However, it will be appreciated by those of ordinary skill in the art that the system could operate equally well in a system having fewer or a greater number of components than are illustrated in FIG. 1. Thus, the depiction of the system 100 in FIG. 1 should be taken as being illustrative in nature, and not limiting to the scope of the disclosure.

The illustrative environment further includes at least one application server 108 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of Hypertext Markup Language (HTML) for at least one Web page using hypertext transfer protocols. The handling of all requests and responses, as well as the delivery of content between the client device 102 and the application server 108, can be handled by the Web server.

Each server can include an operating system that provides executable program instructions for the general administration and operation of that server, and can include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The data store 110 can include several separate data tables, databases, or other data storage mechanisms and media for storing data relating to a particular aspect. For example, the data store illustrated includes mechanisms for storing catalog detail data 112, community data 114, user information 116, and purchase order data 118. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

In one particular embodiment, a system for implementing a marketplace manages a listing of offers submitted by a plurality of first and third party sellers to provide for consumption of one or more items to a buyer. In this example the marketplace system includes a retail server, an offer listing engine, a back end interface, and an offer listing management engine. The engines and interface can be implemented using separate computing systems (e.g., separate servers) or may be implemented as processes on a single computing system. Further, each engine or interface may alternatively be implemented using multiple, distributed systems. The retail server can be configured to provide a front-end interface to buyers and sellers desiring to perform transactions using the marketplace, such as by using a plurality of Web-based interfaces configured to allow buyers and sellers to set up and manage accounts, offer items for sale or other consumption, provide information related to the items for sale, browse items being offered for sale, purchase items being offered for sale, etc. The retail server also can be configured to implement supportive functionality related to these transactions such as security functions, financial transaction functions, user identification functions, etc. The retail server may further be configured to provide an offer listing Web site, which can include a plurality of Web pages displaying items that have been offered for sale by third party sellers.

The offer listing engine in this example is a computing system configured to receive, store, and provide a listing of offers to sell items that have been submitted by a first or third party seller. Each offer within the listing may include a wide variety of information related to the item and the sale of the item such as an item description, an item price, an item condition, shipping information, seller information, etc. The offer listing engine may further be configured to implement one or more functions related to the offer listing, such as a search function callable by the retail server based on input received through a user interface implemented by the retail server. For example, a buyer may retrieve a search interface from the retail server and provide a search term in an input field of the user interface, such as "laptop computer." The retail server may be configured to communicate this search term to the offer listing engine, which is able to implement a search function to search through the offer listing database to generate an offer listing containing all of the items in the offer database that correlate to the submitted search term. Accordingly, the offer listing engine may be configured to generate a complete listing of offers for laptop computers that are currently being offered for sale by third party sellers in the marketplace system.

Figure 2:
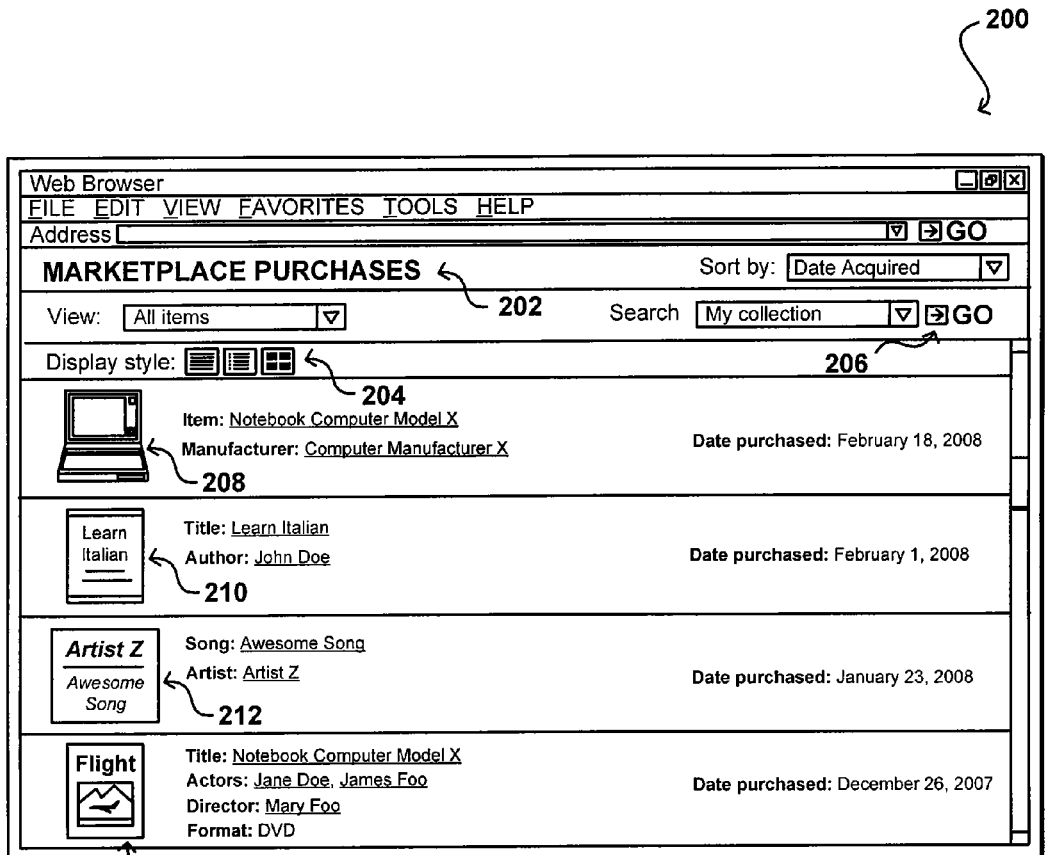
FIG. 2 illustrates an example of a user interface that can be used in accordance with one embodiment.

FIG. 2 shows an example of a page 200 displayed in a Graphical User Interface (GUI), such as a Web browser, that can be generated in accordance with various embodiments described herein. In this particular example a result page in a merchant site is used for purposes of explanation. It should be understood, however, that any appropriate page, document, or other electronic object can be used within the scope and intention of the various embodiments, particularly where instances of content such as multiple, separate images must be transmitted from one point to another electronically.

The example of FIG. 2 includes two types of objects, which will be referred to herein generically as "static" and "dynamic" types, although it should be understood that static portions can change as discussed herein and should not be interpreted rigidly. In the example of a merchant Web page as illustrated, the "static" portions refer to elements of the page that represent standard navigational, informational, or other aspects that generally will be displayed regardless of other content on the page. Such static elements can include a title, caption or logo 202 for the page 200, as well as navigational 204 and user-selectable aspects 206. These static elements, here images such as JPEG images that are typical for use on a Web page, will be displayed each time this version of the page is displayed to a user (where different versions can correspond to different software releases, different user preferences or customizations, etc.). These elements can be considered to be static parts of the Web site, and as such can come from a single source and typically will be stored in cache on a client machine in order to improve a loading speed for the page.

The "dynamic" portions of this example page correspond to elements that are included in the results section. For example, a user might wish to search for items that the user has previously purchased or otherwise consumed from that electronic marketplace, such as through using the user-selectable aspect 206 above. As a result, objects such as images and text will be returned in response to the request, where those images and text correspond to items previously purchased or otherwise consumed (i.e., rented or leased) by the user. Methods for requesting and returning results in an electronic environment are well known and will not be discussed herein in detail. In this example, at least four items are returned in response to the user selection or query. Included in the results corresponding to the items are four images 208, 210, 212, 214, each image being presented with the results for a respective item. While only four images are shown due to constraints of the interface, such as the screen resolution and interface window size, there can be hundreds or even thousands of images returned as the number of search results increases (although the number might be limited by a functional capacity of the interface, etc.). As discussed above, an interface such as a Web browser might only allow two or four connections to a particular Web server or host at a given time. If there are 100 results each with a different image, then even if four connections can be established concurrently, then there still will be on average 25 requests per connection that must be done in sequence, resulting in a substantial delay in the loading time for the overall page. While approaches such as using multiple hosts can be used as discussed above, these approaches come with their own drawbacks.

One approach to improving the load time for such a page is to create a single, large image for the static portions that can be loaded using a single request over a single connection between the device executing the interface and a content server (or elements therebetween). Since the basic, static elements of the site will not change substantially over periods of time, it is possible to simply create a large image, such as by using a standard image editing or creation software package, that can be transmitted to a client device to be utilized by the interface. In one example, a simple image map can be used as known in the art to allow different actions to be captured on the large image based on a relative coordinate of a user selection. Such an approach is limited to using the large image exactly as it is created, and does not allow for a space-wise compression of the image in order to reduce the size of the image to be transferred. Since a page might have static elements at the top and bottom, the image would have to be large enough to cover the entire page, and could present limitations as to what could be placed "over" the image.

In another example, a technology such as Cascading Style Sheets (CSS) can be used, wherein a large image can be "broken up" into several smaller images. As known in the art, CSS sprites technology uses a viewport over a master image to extract portions of that image as smaller, separate images. A viewport as used herein refers to a virtual window, or selectable region, that can be used to extract portions of an image by specifying properties of the viewport to be used in the extraction. In one example, an upper coordinate and a left coordinate are specified, along with a height and width of the viewport, thus defining a rectangular portion of the image. Similar approaches to defining a region of a master image can be used as well within the scope of the various embodiments. Once a viewport has been defined over a portion of the master image, the CSS sprite technology effectively extracts the portion of the image below the viewport and creates a new image on the client device, which can be positioned as desired within the page, frame, window, etc. This is akin to copying the master image and cropping to the desired portion of the copied image. Such an approach can allow navigational and other static elements to be combined into a single image 300 on the server side, and packed in to reduce the size of the master image, such as is shown in FIG. 3(*a*). This generating of a single, static master image could be done by a site designer or other appropriate user, for example. The single image also could be stored in cache on the user device, such that images for the page do not have to be reloaded when a user returns to that page. In some embodiments, a master image can contain static information for several or all pages of a site, such that only a single image needs to be transmitted and cached at the client device, without a need to re-request any of the static elements, regardless of the user's location on the site.

While the composition of static images for a set of pages such as a Web site will provide some advantage, the elements typically are only downloaded once over a period of time and remain in cache, such that the overall reduction in request and loading time for a site is only reduced by a small amount. Further, such an approach requires a user to compose each master image, which could take a substantial amount of time and also requires that each page of the site be coded with the proper image and coordinate information. Where certain sites or pages could most benefit from a master image would be on pages such as item description pages, search result pages, or other pages where a large amount of content is determined dynamically at substantially the time of the request and the client application uses multiple sequential requests to obtain the content.

In the example discussed above with respect to FIG. 2, the user has selected a page wherein all the items that the user has purchased or otherwise consumed through the site are displayed. If a user has purchased 100 items, for example, then 100 images might have to be separately downloaded for the page. Since the results might change between visits to this page by the user, such as when the user purchases additional items, such an image cannot practically be created by a developer to be displayed each time the user visits the page. Further, for sites which can have millions of visitors, such an approach would be a massive undertaking.

Another problem with such an approach is that the images can come from multiple sources. While some embodiments might utilize a single image service or source, large marketplaces, sites, or other content providers might use content from multiple sources, including third party sources, which could also change at any time. Conventional approaches to image composition thus will not work in such an environment.

Systems and methods in accordance with one embodiment instead provide for the dynamic composition and extraction of images in response to a request for content. In such cases, images to be included in a result page or other such display mechanism are determined in response to the request, and composed dynamically before being transmitted to a client or other such device for decomposition and display. For example, FIG. 2 illustrates four images 208, 210, 212, and 214 that correspond to items to be displayed to a user in response to a user request. When a Web server or other such device receives the request, a call to an image service, for example, can cause those four images to be returned to the Web server to be transmitted to the client. Instead of transmitting those images via separate requests, however, the images can be dynamically composed into a single, master image 350 such as is shown in FIG. 3(*b*). The individual images can be arranged or packed to minimize the amount of unused space in the master image, in order to reduce the storage size of the image.

As can be seen in the example of FIG. 3(*b*), the four images have been tightly packed and composed into a single "master" image 350. In order to extract or decompose these images, however, some positional information and/or identifying information must also be provided. For example, as discussed above an approach such as CSS sprites uses a viewport to extract the individual images. If a page wishes to use the third image 212 in rendering a page, the page can access information (such as may be stored in an XML document for the page) indicating positional information (such as top and left coordinates) and/or viewport dimensional information (such as a height and width of the viewport). Other approaches to positioning or locating an image, such as by utilizing two opposite coordinates defining the viewport dimensions and position, also can be used. In cases where the images to be displayed are all of the same size, dimensional information may not need to be determined and/or transmitted, as a single coordinate might then be enough information to extract each image as the size of the viewport would not change. In other embodiments, the images might be resized, cropped, or otherwise modified to a common size, such that dimensional information also is not needed. In embodiments where images are resized before being composed into the master image, dimensional information might be needed both to extract the image from the master image and to resize the image back to its original size.

Figures 3A, 3B:
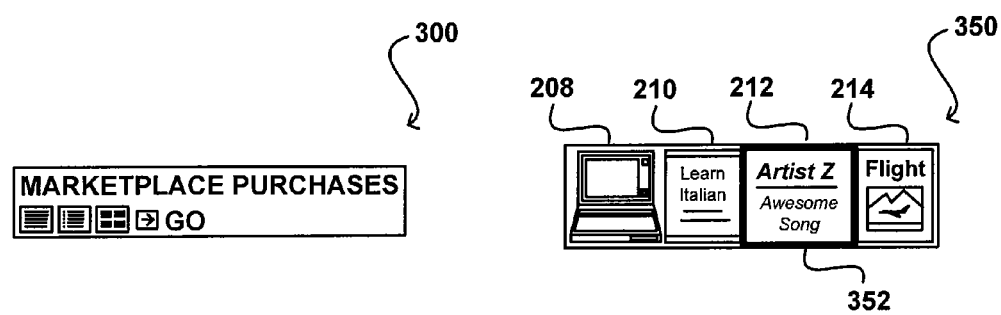
FIGS. 3(a) and 3(b) illustrate composed images that can be used to generate portions of the example interface of FIG. 2.

As shown in FIG. 3(b), once the coordinate information and viewport dimension information are determined, the viewport 352 can be positioned relative to the target image 212 in the master image 350 so that the individual image can be "extracted" and treated functionally as a separate image. In order to utilize the extracted image, as well as to cache the image for subsequent use if desired, it also is desirable in at least one embodiment to also provide an image identifier for the image. This can be helpful in correctly placing the image, particularly where a common image might be used more than once on a page. In this way, the images on a page can be sent using one, two, or four images, for example, which can correspond to the maximum number of connections to a host or server, such that all the images can effectively be downloaded in parallel with one or more concurrent requests.

As referenced above, such an approach can improve the overall performance in loading a page. In a Web environment, for example, each HTTP or other client request to a server has some level of associated overhead. In the case of requesting an image that is about 2 or 3 KB in size, the request sent to the server might include about 1 KB of information to obtain that image. If there are 100 images to be downloaded, such an approach can save 99 KB of upload. This is further advantageous in situations where upload speeds from a client are slower than download speeds from the server. Also, there is only a need to wait for a response to a single request, or a single set of concurrent requests, such that there is no sequence of waiting as in prior systems.

Another potential advantage can be obtained in that, in at least some cases, a single all-encompassing color map or smaller overall color map can be used for all images for a page when composed, which can further reduce the information that must be transmitted for the page. When considering the HTTP headers in both directions, along with the color map across all the images, there is a significant reduction in the amount of network traffic for providing such pages.

In one embodiment images are composed by first creating a virtual canvas for the images, then requesting and/or creating a bitmap (or other uncompressed) version of each individual image. The images are then placed on the canvas in an appropriate order, and can be packed to minimize canvas size as discussed elsewhere herein. Once the image is created, any desired changes to the color map can be executed, or a new color map generated, and the image can be compressed into a standard format such as a JPEG or GIF format. The coordinates for each of the individual images also can be stored. Various media libraries exist that allow images to be decompressed, composed, and compressed that could be used as would be apparent to one of ordinary skill in the art in light of the teachings and suggestions contained herein. Such a process can take on the order of tens or hundreds of milliseconds in one example, instead of the amount of time it would take to manually create such an image.

In some embodiments a calculation can be done, or a threshold used, to determine whether it would be beneficial to utilize a composed image. For example, if there are 10 images or less, there may be no significant advantage to going through the composing process to cause the download of a large image. Also, if the overall canvas will include a substantial amount of "dead space" due to the difference in sizes or shapes of the individual images, then the images might not be composed. Another threshold might set a maximum size on a composed image, in which case additional master images may be used that contain a portion of the individual images for a page.

As discussed, there can be many applications for such approaches to content delivery. For example, a search engine that returns results from multiple sources but does not actually own or host any of the content might use such approaches advantageously. Ad campaigns, rotating banner ads, and many other such applications can also take advantage of such approaches. Further, while images are used as an example, other types of electronic content can be used as well, as appropriate.

Figure 4:
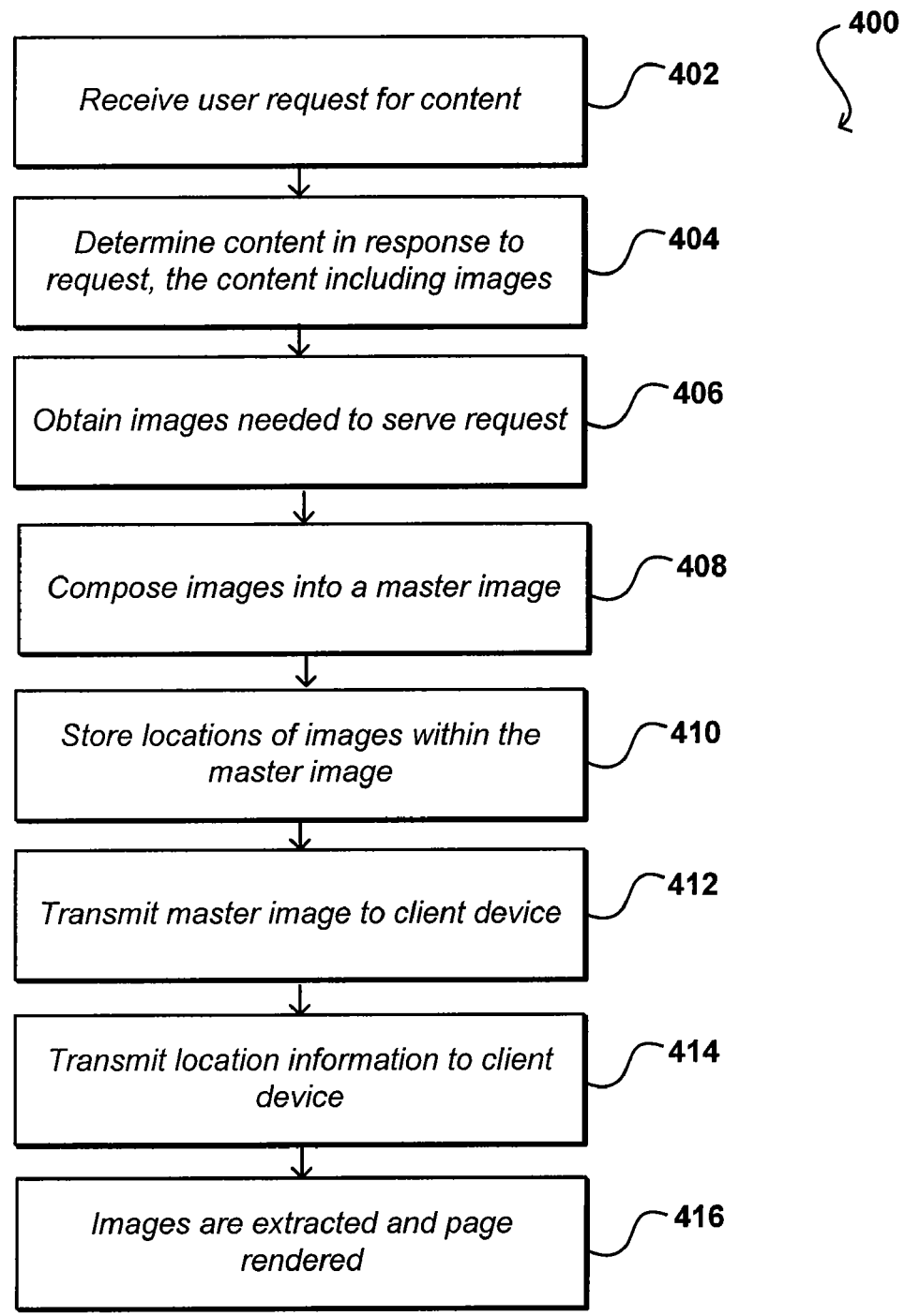
FIG. 4 illustrates a method of determining and composing images that can be used in accordance with one embodiment.

FIG. 4 illustrates steps of an exemplary method 400 for composing content for delivery that can be used in accordance with one embodiment. In this method, a user request is received from a client device 402, such as from Web browser on a personal computer. The user request can include query information, such as a search query or keywords, terms, or attributes used to generate a user query. As should be apparent, a search query could be generated by a client sending the request or by a device, application, or service receiving the request, using terms, keywords, attributes, etc. For example, a user might type in the keywords "men" and "shoes" when looking to buy shoes through an electronic marketplace, and the request to obtain search results matching those terms could either include a query formed using those keywords, or could include the actual keywords which then could be formed into a search query on the server side. Accordingly, the query is not limited to user-submitted keywords, but can be based on selected attributes, for example through checkboxes or other selection mechanisms, that define an attribute-based search of items. For example, a user might browse an electronic catalog of items by narrowing based on attributes such as a specific brand, price range, color, type, among other attributes, with or without submitting additional freeform keywords.

In response to receiving the query, results for the query are determined which contain multiple images 404. The images needed to serve the request are obtained 406, such as from an image service or at least one image data store. The images are then composed into a single image using any of the approaches discussed or suggested herein 408. In one example, image libraries are used to decompress the images, paste the images onto a blank canvas, and then recompress the resulting master image. In another embodiment, where a composition service is used, parameters for the various images can be passed using a uniform resource locator (URL) query string, for example, which can include a portion such as "?params=abc" to designate that images A, B, and C need to be composed. As discussed, the images can be packed in any appropriate manner, such as in a row, column, or rectangular fashion, and the placement can be adjusted to minimize dead space or reduce the overall storage size of the composed master image. Any of a number of packing algorithms can be used as known in the art. One service that can be used to compose images in accordance with one embodiment is RMagick for the Ruby programming language, utilizing ImageMagick graphics manipulation libraries (open source).

During or around the time of the composition process, the positions of each image in the master image are stored 410. These positions can be stored in cache or other memory until needed. Identities of the various images also can be stored. Once the images are composed into a master image, the master image can be transmitted to the client device 412. The positional information for each of the images also is transmitted to the client device 414, such as in the form of data in an XML document or other data structure for a results page to display the images. Once the master image and positional information are received by the client device, the individual images are extracted and the page rendered 416, such as by using CSS. As discussed above, the positional and dimensional information also can be used to generate an image map to be rendered using the master image. Other embodiments might utilize the information in an XML document or other such data structure to render the image information using different technologies as would be apparent to one of ordinary skill in the art in light of the teachings and suggestions contained herein.

Figure 5:
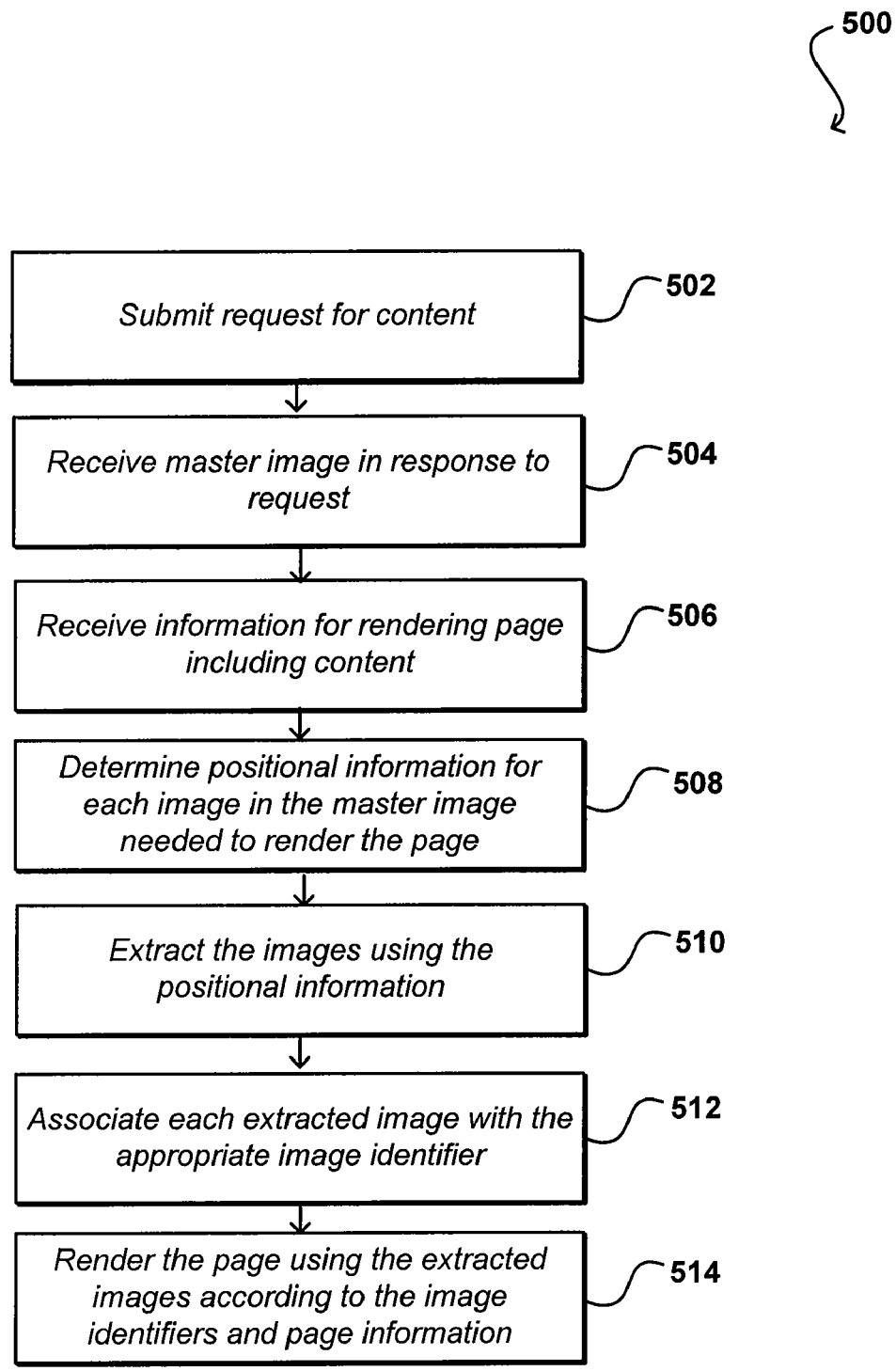
FIG. 5 illustrates a method of extracting individual images from a composed image that can be used in accordance with one embodiment.

FIG. 5 illustrates steps of a method 500 for decomposing a master image and generating a page that can be used in accordance with one embodiment. As discussed above, a request for content is submitted 502. In response to the request, a master image is received 504 along with information for a page to be rendered 506. Information for the page can include, for example, an XML document or HTML document including information necessary to extract individual images from the master image. Positional data is determined for each image in the master image using the page information 508. As discussed, this can include coordinate information and/or viewport dimensional information needed to determine the region of the master image that corresponds to each individual image. Each image is then extracted using the positional information 510. As discussed, this can involve utilizing CSS sprite technology to extract portions of the master image using a viewport in order to generate the individual images on the client device. The extracted images can be associated with the corresponding image identifier 512, and then can be used to render the page 514. In cases where the large image is cached, the positional information can also be stored in order to allow the images to be re-extracted if the page is re-loaded.

In some embodiments an XML document is returned which contains a URL to a location where the composite image is stored, whereby the composite image can be retrieved as necessary. This could be accomplished, for example, on a Web server selected for serving the result page. The Web server would parse the XML data and utilize a mapping to the original images from the new composite format. All image tags in a page then could simply reference the composite image, which could be downloaded to the client device. The master image can be stored in cache such that calls can be made from CSS or another such technology to obtain the individual images as needed, saving the need for subsequent requests to the server or a need to regenerate the composite image. As discussed, the master image can also store images or elements for additional pages, frames, or portions of a site, for example. A tradeoff in such a case is how much information to place into an image relative to the amount of time needed to download the master image and the memory needed to store the master image, particularly if only a small portion of the master image might be reused. If using the master image for multiple pages, for example, the pro-grammer or other developer would have to know and maintain the identifier of the portion of the image to be used, etc.

In an embodiment utilizing CSS sprite technology, images can be used as backgrounds such that any arbitrary element, such as a DIV element, can have a class set which references CSS. In this case, a class such as CSS.imageclass can have as a source the master image. Calls would then specify an upper and left offset to move the DIV viewport to the appropriate place relative to the master image. A call to the class also specifies a height and width to close off the viewport. Such an approach allows the pages to be developed in HTML with CSS embedded therein, but traditional ways of showing images using image tags may not work as those image tags require unique images and source information.

In one example, a canvas is created that is as wide as the widest image to be displayed and tall enough to fit in all the images if packed in a column. In some embodiments, a one-pixel space is provided between images for separation, and each image is left-aligned. In such an example, a single background image can be applied to an anchor element, and the new CSS classes shift the background position with just −y coordinates:

```
#nav li a {background-image:url('../img/image_example.jpg')}
#nav li a.first_element {background-position:0px 0px}
#nav li a:viewport.first_element {background-position:0px -100px}
#nav li a.second_element {background-position:0px -150px;}
#nav li a:viewport.second_element {background-position:0px -175px;}
...
```

In this example, two images are designated by "first_element" and "second_element", there the position is established by (x, y) coordinates, and the viewport is established by adjusting the y value of "viewport" state to the appropriate height (and the full width of the column). Another example for offsetting the background image since the pixel locations are known allows for only the state to be shown:

```
#panel1b a:viewport {background: transparent url(example.gif)0px 0px no-repeat;}
#panel2b a:viewport {background: transparent url(example.gif)-96px 0px no-repeat;}
#panel3b a:viewport {background: transparent url(example.gif)-172px 0px no-repeat;}
#panel4b a:viewport {background: transparent url(example.gif)-283px 0px no-repeat;}
```

The first value is the horizontal offset from the left edge, and the second value is the vertical offset (from the top). Here, each vertical value is equal since the master image has the images stacked in a row instead of a column.

In some embodiments, the dynamic composition of images can be provided as a service to various users, applications, etc. For example, any application that intends to transmit a number of images across a network can use a dynamic composition service, which can receive the images to be transmitted, compose the images into a master image, and return (or send to the intended recipient) the master image and the positional information. If the images are not being returned to the application, or if the images have different sizes, for example, the dimensional information may also be sent along with the master image. In some embodiments the images is sent with a service request, while in other embodiments a URL or other location information is sent whereby the service is able to retrieve the image information. The service then can account for and charge using a variety of approaches used with such services, such as via a pay-per-use system, a subscription based system, or the like.

Dynamic composition also can be provided advantageously in a number of different areas, as any application or implementation where multiple images are transmitted over a network or other such connection may benefit from aspects of dynamic image composition. Examples discussed herein refer to use of image composition when a number of images are displayed with a result set, such as items purchased through an electronic marketplace or search results in response to a user query for information. Many other such applications could benefit as well, such as image hosting services which allow users to upload, edit, delete, and view any number of images. Various other aspects of merchant sites also could benefit, such as item search results, item recommendations, personalized content, item accessories, or any other such aspect wherein images to be displayed are determined at substantially the time of the user request or viewing, such that the images cannot practically be composed ahead of time and the transferring could benefit from a single, or small number of, connections. In particular, instances where a large number of thumbnail images are to be displayed can benefit from such approaches.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®. In one embodiment a system utilizes Berkeley DB, which is a family of open source, embeddable databases that allows developers to incorporate within their applications a fast, scalable, transactional database engine with industrial grade reliability and availability.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of delivering images for use in generating a Web page, comprising:
   under the control of one or more computer systems configured with executable instructions,
   receiving by a host a request from a Web browser on a client device; and
   in response to receiving the request, at least:
      determining a plurality of images to be used in generating a Web page to be displayed through the Web browser;
      composing a first portion of the plurality of images into a first master image and composing at least one further portion of the plurality of images into at least one further master image, a total number of the master images limited at least in part by a maximum number of allowed concurrent connections between the client device and the host;
      for each of the master images, at least storing positional and dimensional information for each image in the incorporated portion of the plurality of images relative to the master image; and
      reducing content delivery time at least in part by concurrently providing the master images, positional information, and dimensional information to the client device to enable a cascading style sheets (CSS) sprite module on the client device to utilize the positional and dimensional information to locate and extract each of the plurality of images in each master image in order to generate the Web page to be displayed in the Web browser in response to the request.

2. A computer-implemented method according to claim 1, wherein:
   for each master image, the CSS sprite application utilizes the positional information and dimensional information to form at least one viewport relative to the master image, whereby the at least one viewport is able to be positioned and sized accordingly to extract any of the plurality of images in the master image for presentation.

3. A computer-implemented method according to claim 1, further comprising:
   retrieving the determined plurality of images from a plurality of sources before composing the subsets of the plurality of images.

4. A computer-implemented method of transmitting images in an electronic environment, comprising:
   under the control of one or more computer systems configured with executable instructions,
   in response to receiving by a host a request for content from a client device, at least determining a plurality of images associated with the content;
   composing a first portion of the plurality of images into a first master image and composing at least one further portion of the plurality of images into at least one further master image, a total number of the master images limited at least in part by a maximum number of allowed concurrent connections between the client device and the host;
   for each of the master images, at least storing positional information for each image in the incorporated portion of the plurality of images relative to the master image; and
   reducing content delivery time at least in part by concurrently providing the composed master images and the stored positional information in response to the request for content, whereby each of the plurality of images is able to be extracted using the provided positional information.

5. A computer-implemented method according to claim 4, wherein:
   for each master image, storing positional information includes determining coordinates for each of the plurality of images in the master image that corresponds to a position of the image in the master image.

6. A computer-implemented method according to claim 4, further comprising:
   storing dimensional information for each of the plurality of images, the dimensional information able to be provided with the positional information for use in extracting each of the plurality of images.

7. A computer-implemented method according to claim 4, wherein:
   each of the plurality of images is provided in one of the master images.

8. A computer-implemented method according to claim 4, further comprising:
   determining a separate plurality of images relating to portions of an interface used to display the requested content; and
   composing the separate plurality of images into a separate master image and providing the separate master image in response to the request, whereby the separate plurality of images is able to be extracted and used to generate at least a portion of the interface.

9. A computer-implemented method according to claim 4, further comprising:
   for at least one of the master images, using the master image and the positional information to generate an image map, wherein the positional information is used to determine mappings for each of the plurality of images in the master image.

10. A computer-implemented method according to claim 4, further comprising:
    retrieving the determined plurality of images from a plurality of sources before composing the portions of the plurality of images.

11. A computer-implemented method according to claim 4, wherein:
    the content relates to items available for consumption through an electronic marketplace.

12. A computer-implemented method according to claim 4, wherein:
    at least one of the master images, contains one or more images for use in generating multiple pages relating to the content.

13. A computer-implemented method according to claim 4, further comprising:
    determining a positioning of each of the plurality of images in at least one of the master images to optimize a canvas size of the master image.

14. A computer-implemented method according to claim 4, further comprising:
    for at least one of the master images, generating a new color map for the master image in order to reduce a storage size of the master image.

15. A computer-implemented method according to claim 4, further comprising:

caching the master images and positional information, whereby the plurality of images do not need to be recomposed in response to a subsequent request for substantially the same content.

16. A computer-implemented method for providing search results, comprising:
under the control of one or more computer systems configured with executable instructions,
receiving by a host a request from a client device including query information;
determining a set of search results corresponding to the query information, the set of results including a plurality of images;
composing a first portion of the plurality of images into a first master image and composing at least one further portion of the plurality of images into at least one further master image, a total number of the master images limited at least in part by a maximum number of allowed concurrent connections between the client device and the host;
storing positional information for each of the plurality of images relative to at least one of the master images; and
reducing content delivery time at least in part by concurrently providing the master images, the positional information, and information regarding the set of search results in response to the request, whereby each of the plurality of images is able to be extracted using the positional information in order to generate a search result page including at least a portion of the plurality of images.

17. A computer-implemented method according to claim 16, further comprising:
providing for caching of at least one of the master images, the positional information, and the information regarding the set of search results, whereby the plurality of images is able to be extracted over multiple separate pages of search results.

18. A computer-implemented method according to claim 16, further comprising:
determining a positioning of each of the plurality of images in at least one of the master images to optimize a canvas size of the master image.

19. A system for delivering images in an electronic environment, comprising:
a processor; and
a memory device including instructions that, when executed by the processor, cause the processor to, at least:
in response to receiving by a host a request for content, at least determine a plurality of images associated with the requested content;
compose a first portion of the plurality of images into a first master image and compose at least one further portion of the plurality of images into at least one further master image, a total number of the master images limited at least in part by a maximum number of allowed concurrent connections to the host;
store positional information for each of the plurality of images relative to at least one of the master images; and
reduce content delivery time at least in part by concurrently providing the set of master images and the positional information in response to the request for content, whereby each of the plurality of images is able to be extracted using the positional information.

20. A system according to claim 19, wherein the memory device further includes instructions that, when executed by the processor, cause the processor to, at least:
determine a positioning of each of the plurality of images in at least one of the master images to optimize a size of the master image.

21. A system according to claim 19, wherein the memory device further includes instructions that, when executed by the processor, cause the processor to, at least:
generate a new color map for at least one of the master images, to reduce a storage size of the master image.

22. A computer program product embedded in a non-transitory computer readable medium for delivering images in an electronic environment, comprising:
program code for, in response to receiving a request for content, at least determining a plurality of images associated with the requested content;
program code for composing a first portion of the plurality of images into a first master image and composing at least one further portion of the plurality of images into at least one further master image, a total number of the master images limited at least in part by a maximum number of allowed concurrent connections;
program code for storing positional information for each of the plurality of images relative to at least one of the master images; and
program code for reducing content delivery time at least in part by concurrently providing the master images and the positional information in response to the request, whereby each of the plurality of images is able to be extracted using the positional information.

23. A computer program product according to claim 22, further comprising:
program code for determining a positioning of each of the plurality of images in at least one of the master images to optimize a size of the master image.

* * * * *